United States Patent [19]

Betts et al.

[11] Patent Number: 4,811,357

[45] Date of Patent: Mar. 7, 1989

[54] SECONDARY CHANNEL FOR DIGITAL MODEMS USING SPREAD SPECTRUM SUBLIMINAL INDUCED MODULATION

[75] Inventors: William L. Betts, St. Petersburg; Edward S. Zuranski, Largo, both of Fla.

[73] Assignee: Paradyne Corporation, Largo, Fla.

[21] Appl. No.: 140,405

[22] Filed: Jan. 4, 1988

[51] Int. Cl.[4] .............................................. H04L 27/30
[52] U.S. Cl. .......................................... 375/1; 380/33
[58] Field of Search ........................ 375/1; 380/33, 34; 371/2, 43

[56] References Cited

U.S. PATENT DOCUMENTS

| | | | |
|---|---|---|---|
| 3,089,921 | 5/1963 | Hines | 380/33 |
| 3,204,034 | 8/1965 | Ballard et al. | 380/33 |
| 4,149,121 | 4/1979 | Gordy et al. | 375/1 |
| 4,317,204 | 2/1982 | Gordy et al. | 375/1 |
| 4,494,238 | 1/1985 | Groth, Jr. | 375/1 |
| 4,560,832 | 12/1985 | Bond et al. | 380/33 |
| 4,748,636 | 5/1988 | Kato | 375/1 |

Primary Examiner—Salvatore Cangialosi
Attorney, Agent, or Firm—Kane, Dalsimer, Sullivan, Kurcz, Levy, Eisele and Richard

[57] ABSTRACT

A system and method are provided for use of a secondary channel in high speed (greater than 2400 bits per second) wire line modems to provide low speed (around 110 bits per second) non-interfering communications for control or monitoring functions. The secondary channel is used to monitor, configure and test the modems in the network using commands sent over the secondary channel. Secondary channels are also used in low duty cycle applications such as in alarms or teletype data transmission. The invention provides a spread spectrum secondary channel which occupies the same bandwidth as the primary data channel and is immune to jamming tones that would interfere with conventional frequency shift keying secondary channels. The spectrum spreading is achieved through use of the primary channel's trellis encoder. Phase shifts of 0°, 90°, 180° or 270° are induced depending upon the trellis state. This rotation simplifies decoding which as a result can be done in the reference system of the decoded primary trellis signals instead of the baseband equalizer reference system. The primary trellis decoder automatically resolves the 90° references. There is no penalty in terms of additional circuitry or software because the transmitter spreading eliminates the need for additional rotation in the receiver which is required for non-spread signals.

8 Claims, 2 Drawing Sheets

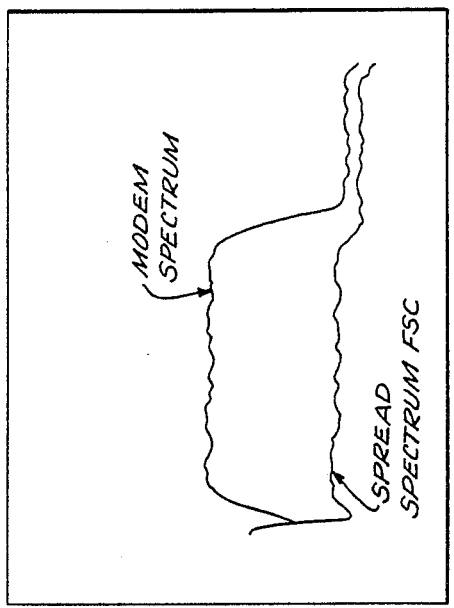
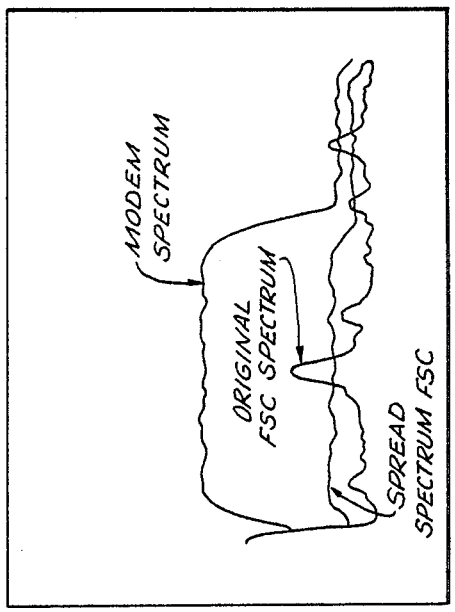

SECONDARY CHANNEL FOR DIGITAL MODEMS USING SPREAD SPECTRUM SUBLIMINAL INDUCED MODULATION

This application is somewhat related to the co-assigned U.S. application entitled "Secondary Channel by Induced Modulation" being filed simultaneously herewith.

BACKGROUND OF THE INVENTION

1. Field of the Invention

The invention relates to a spread spectrum secondary channel which occupies the same bandwidth as a primary data channel in a system wherein modems are transmitting and receiving information on a communications medium such as a telephone line.

2. Description of the Prior Art

Secondary channels have been used in high-speed (greater than or equal to 2400 bits per second) wireline modems to provide low speed (110 bits per second) non-interfering communications for control or monitoring functions. For instance, a secondary channel has been used in modems manufactured by the Paradyne Corporation (the assignee of the present invention) in their "Analysis" system. The "Analysis" system allows the user to monitor, configure, and test the modems in the network using commands sent over the secondary channel. Secondary channels are also used in low-duty cycle applications such as with alarms or teletype data transmission.

Secondary channels have also been implemented by using a completely independent Frequency Shift Keyed (FSK) channel that is placed in an unused portion of the telephone line spectrum.

SUMMARY OF THE INVENTION

The present invention provides a circuit for producing a spread spectrum secondary channel which occupies the same bandwidth as the primary channel and is immune to jamming tones that would interfere with a secondary channel generated by conventional frequency shift keying means or by the aforementioned "Secondary Channel by Induced Modulation" demodulators. This advantage is achieved without any further degradation of the primary data channel than occurs in the original "Secondary Channel by Induced Modulation" circuit.

The spectrum spreading of the circuit and method of the present invention is achieved through use of the primary channel's trellis encoder. Phase shifts of 0 degrees, 90 degrees, 180 degrees or 270 degrees are induced depending on the trellis state. This method simplifies decoding which as a result can be done in the reference system of the decoded primary trellis signals instead of in the baseband equalizer reference system. The primary trellis decoder automatically resolves the 90 degree reference changes. There is no addition in circuitry or software for the systems since the spreading of the spectrum in the transmitter modem eliminates by the aforementioned rotations the need for additional rotations in the receiver which are required for non-spread signals.

The invention presents a new concept. The secondary channel is immune to jamming tones by spreading its frequency spectrum over the primary channel. The secondary channel benefits by using the primary carrier in the center of the channel which is not attenuated and by taking full advantage of the primary channel adaptive receiver.

BRIEF DESCRIPTION OF THE DRAWINGS

FIGS. 2 and 3 are photographs comparing the spectrums of the primary modem channel, the secondary channel as achieved by the aforementioned previous "Secondary Channel by Induced Modulation" application and the spread spectrum subliminal induced modulation of the present invention.

DESCRIPTION OF THE PREFERRED EMBODIMENT

Figure 1:
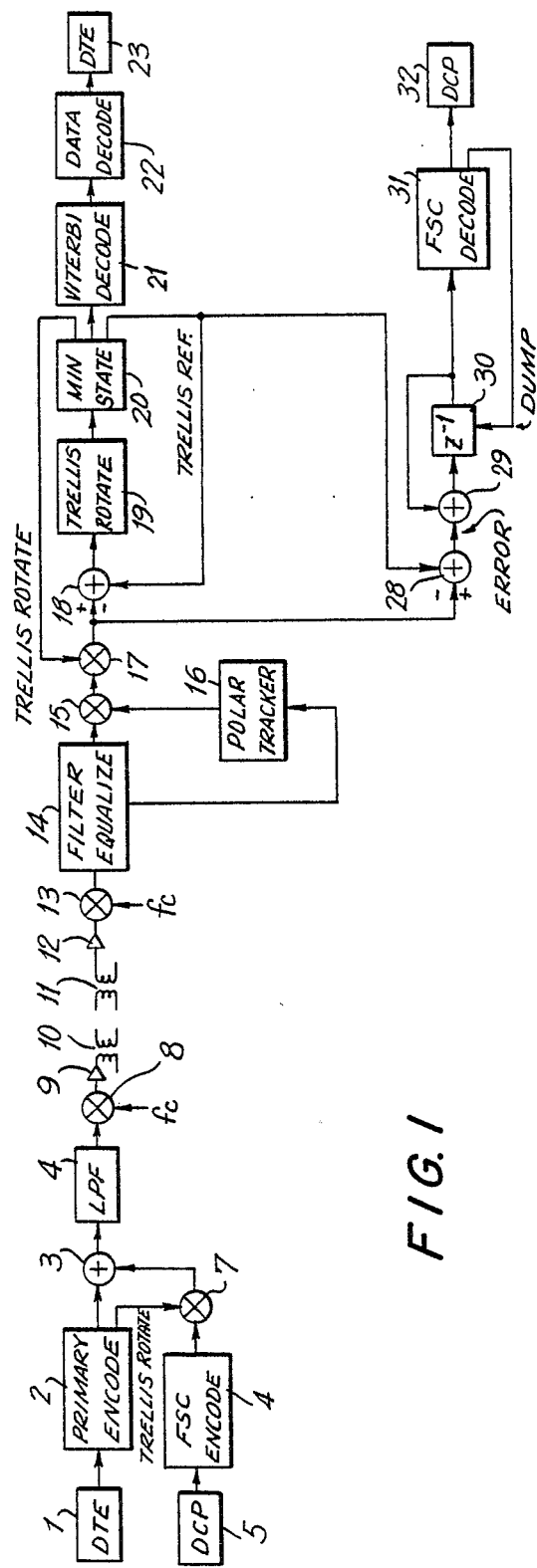
FIG. 1 is a schematic of the system of the present invention.

FIG. 1 shows a Data Terminal Equipment (DTE) 1 having an input to a primary encoder 2 and an output to a summer 3. Another output to summer 3 comprises a signal which is derived by taking the secondary channel output from FSC encoder 6 which encoded an output from DCP 5 and using an output from trellis encoder 2 to rotate the secondary channel signal by phase shifts of 0 degrees, 90 degrees, 180 degrees or 270 degrees depending on the trellis state. This rotation at the primary band rate acts to spread the FSC spectrum.

After leaving summer 3 the signal passes through a standard QAM TX filter 4, mixer 8, amplifier 9, and transformer 10 whereupon it is transmitted over a channel (not shown) such as a telephone line.

At the receiver end of the channel the signal passes through a transformer 11, amplifier 12, QAM demodulator 13, and the modem receiver filter and equalizer 14. The output of filter equalizer 14 is fed to another mixer 15 wherein the signal is rotated by the output from polar tracker 16 and then conveyed to a trellis rotation module 17. Polar tracker 16 is a standard modem phase tracking/carrier recovery loop. Since all decoding is done after the receiver trellis rotation, the need to inversely rotate the trellis references is avoided. The signal from trellis rotate module 17 is fed to a summer 18 wherein it is combined with a feedback signal from state module 20 which itself has an input from trellis decoder 19 which in turn has an input from the aforementioned summer 18.

Another feedback path exists from state module 20 back to trellis rotate module 17. Still another output from state module 20 which is equal to the state with minimum Euclidean distance from the input to state module 20 is conveyed to Viterbi decoder 21 and then in series to data decoder 22 and data terminal equipment 23 wherein the primary channel information is derived.

The secondary channel information is derived in a path comprising in series an output from delay element 30 which is input to FSC decoder 31 and then conveyed to Digital Control Processor (DCP) 32 wherein the secondary channel information is derived.

Another output from FSC decoder 31 is conveyed in a feedback path to the aforementioned summer 28.

With respect to the FSC decoder 31, it is noted that this decoder is operated synchronously over $m_1$ bauds of primary data. At the end of each di-bit (FSC signalling integral) FSC integrator 30 is dumped (reset to zero) before starting the next space di-bit.

The FSC can be induced directly on the primary carrier without trellis rotation. No implementation savings is realized because the trellis reference used in summer 28 and the receiver must be rotated. Spread spectrum adds no cost but avoids rejection of jamming tones.

As stated previously FIGS. 2 and 3 show photographs of the spectrums of the primary modem channel, the aforementioned "Secondary Channel by Induced Modulation" application, and the spread spectrum subliminal induced modulation of the present application.

The FSC power level is 38 dB below primary and 10 dB below the noise tolerance. This raises the composite noise power by ½ dB. The QPSK channel has a 13 dB performance advantage over Trellis Code Modulation TCM19.2. The spread gain is due to the 56 symbol integration period (or bandwidth de-spread). QPSK requires 15 dB SNR @$10^{-6}$ or 12.5 @$10^{-4}$ or 11.0 dB @$10^{-3}$.

The FSC modulation index is calculated to be 42 dB below primary using $12_{10}$ for FSC and $115_{10}$ for primary modulation. RMS primary power is 162.75 $(115)^2$. Spectrum photos (with high background noise) show FSC at $-38$ dB. RMS power with 3 kHz filter show 36.5 dB. Primary $10^{-4}$ BER occurs at 3 kHz SNR=26 dB=spectrum ratio of in-band power.

Although a preferred embodiment of the invention has been shown herein, it will be appreciated that many other embodiments of the invention are contemplated within the scope of the appended claims.

What is claimed is:

1. A method employing digital modems for transmitting a secondary channel over a communications connection such as a telephone line comprising the steps of:
   generating a primary channel signal;
   encoding said primary channel signal;
   generating a secondary channel signal;
   FSC encoding said secondary channel signal;
   rotating the FSC encoded signal through phase shifts generated by a trellis encoder at the primary baud rate to spread said FSC encoded signal's frequency spectrum;
   combining said primary channel signal and said rotated FSC encoded signal; and
   transmitting said combined signals over said communications connection.

2. The method of claim 1 further comprising the steps of rotating the signals received from said communications connection using an output from a trellis decoder.

3. The method of claim 2 further comprising Viterbi decoding a signal from said trellis decoder to generate a decoded primary channel signal and FSC decoding said rotated received signals to generate decoded secondary channel data signals.

4. The method of claim 3 further comprising performing said FSC decoding synchronously over $m_1$ bauds of primary channel signals and setting to zero the contents of an FSC cancellor and FSC integrator at the end of each FSC signalling interval, and said FSC integrator having an output connected to an FSC decoding module.

5. A system employing digital modems for transmitting a secondary channel over a communications connection such as a telephone line comprising:
   means for generating a primary channel signal;
   a trellis encoder connected to an output of said primary channel signal generating means;
   means for generating a secondary channel signal;
   an FSC encoder connected to an output of said secondary channel generating mean; said trellis encoder having an output connected to an output of said FSC encoder for rotating the FSC output signal through the trellis encoder stated rotation at the primary baud rate to spread the frequency spectrum of said FSC output signal;
   means for combining said spread FSC output signal with another output from said trellis encoder, said another output constituting an encoded primary channel signal; and
   means for transmitting said combined signals over said communications connection.

6. The system of claim 5 wherein said means for transmitting said combined signals comprises in series a low pass filter, a first mixer, a amplifier, and a transformer.

7. The system of claim 5 further comprising, at a receiver end of said communications connection, a filter equalizer, a second mixer connected to an output of said filter equalizer, a trellis rotate module connected to an output of said second mixer, a first summer having an input from said trellis rotate module, a minimum state module, a first output providing a feedback Trellis rotate signal to an input of said trellis rotate module, and a second output providing a feedback trellis reference signal to an input of said first summer, a Viterbi decoder connected to a third output of said min state module and means connected to an output of said Viterbi decoder for reproducing said generated primary channel signal, a second summer having inputs comprising an output from said min state module and an output from said trellis rotate module, a third summer having an input from said second summer, a first inverter having an input from said third summer and having a feedback output to said third summer, an FSC decoder connected to an output of said first inverter and means connected to an output of said FSC decoder for reproducing said generated secondary channel signal.

8. The system of claim 7 further comprises a second inverter having a first input from an output of said FSC decoder, having a second input from said trellis rotate module, and further comprising a polar tracker having an input from said first summer and an output to said first mixer which is added to said feedback trellis reference signal.

* * * * *